(12) United States Patent
Vallet et al.

(10) Patent No.: US 8,096,322 B2
(45) Date of Patent: Jan. 17, 2012

(54) MICROFLUIDIC DEVICE WITH VARIABLE VOLUME MATERIAL

(75) Inventors: Véronique Vallet, Bussigny-près-Lausanne (CH); Frédéric Neftel, Lausanne (CH); Laurent-Dominique Piveteau, Bussigny-près-Lausanne (CH); Niklaus Schneeberger, Pully (CH)

(73) Assignee: Debiotech SA, Lausanne (CH)

( * ) Notice: Subject to any disclaimer, the term of this patent is extended or adjusted under 35 U.S.C. 154(b) by 669 days.

(21) Appl. No.: 12/302,384

(22) PCT Filed: May 29, 2007

(86) PCT No.: PCT/FR2007/051346
§ 371 (c)(1),
(2), (4) Date: Nov. 25, 2008

(87) PCT Pub. No.: WO2007/138227
PCT Pub. Date: Dec. 6, 2007

(65) Prior Publication Data
US 2009/0199917 A1    Aug. 13, 2009

(30) Foreign Application Priority Data
May 29, 2006  (FR) ...................................... 06 51936

(51) Int. Cl.
*F15C 1/04*    (2006.01)
(52) U.S. Cl. ......................... 137/831; 422/503; 422/504
(58) Field of Classification Search .................. 137/825, 137/827, 828, 829, 833; 251/11; 417/505; 422/502–507
See application file for complete search history.

(56) References Cited

U.S. PATENT DOCUMENTS

| 7,159,618 B2 * | 1/2007 | Broyer et al. ................ | 137/828 |
| 2009/0044875 A1 * | 2/2009 | Griss et al. ..................... | 137/828 |

FOREIGN PATENT DOCUMENTS

| FR | 2856046 A1 | 12/2004 |
| WO | 0117797 A1 | 3/2001 |
| WO | 2004050242 A2 | 6/2004 |

OTHER PUBLICATIONS

Andersson et al.; "Expandable Microspheres-Surface Immobilization Techniques", Sensors and Actuators B; May 15, 2002; pp. 290-295; 84; Elsevier; Stockholm, Sweden.

(Continued)

*Primary Examiner* — Craig Schneider
(74) *Attorney, Agent, or Firm* — The Webb Law Firm

(57) ABSTRACT

The invention relates to a microfluidic device comprising a first plate forming the substrate and including at least one perforation and, on either side of said first plate, at several locations, a material for defining passage portions consisting, in at least one of said locations, of an activatable material varying in volume on activation, said material being disposed at said locations in an arrangement that, during a first phase and upon activation of at least one location consisting of said activatable material, transforms it from a first configuration to a second configuration, modifying a three-dimensional network corresponding, in the second configuration and depending on the selected location(s) that are activated in said first phase, to different liquid paths including passage portions in offset planes parallel to the plane of the first plate, at least on either side of said first plate, and between which at least one of said perforations is located.

15 Claims, 4 Drawing Sheets

OTHER PUBLICATIONS

Griss et al.; "Liquid Handling Using Expandable Microspheres"; Proceedings of the IEEE 15th Annual International Conference on Microelectro Mechanical Systems; Jan. 20, 2002-Jan. 24, 2002; pp. 117-120; vol. Conf. 15; XP010577609.

Samel et al.; "Expandable Microspheres Incorporated in a PDMS Matrix: a Novel Thermal Composite Actuator for Liquid Handling in Microfluidic Applications"; Transducers, Solid-State Sensors, Actuators and Microsystems, 12th International Conference; Jun. 9, 2003; pp. 1558-1561; vol. 2; Piscataway, NJ.; XP010647522.

* cited by examiner

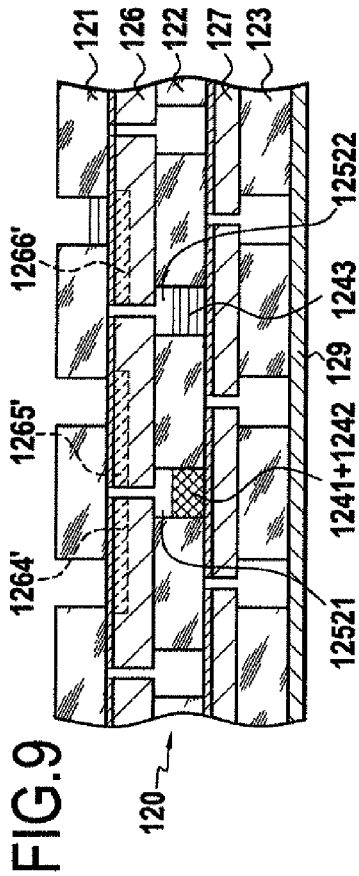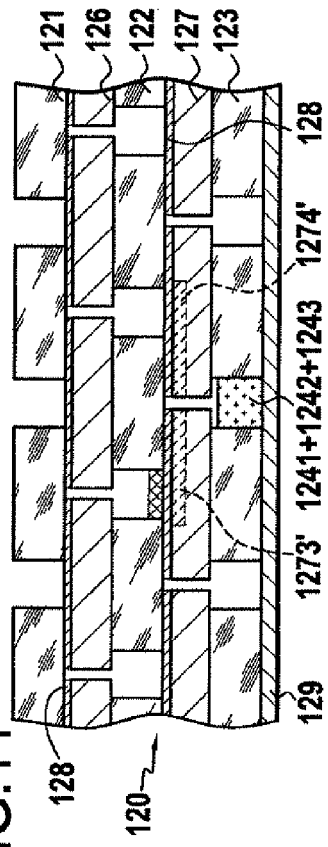
FIG.7 FIG.8 FIG.9 FIG.10 FIG.11

MICROFLUIDIC DEVICE WITH VARIABLE VOLUME MATERIAL

BACKGROUND OF THE INVENTION

1. Field of the Invention

The present invention relates to a microfluidic device for circulating liquid. To be more precise, the present invention relates to the use of a liquid circuit in a small device for use in the fields of chemistry, biology, biochemistry, and medicine.

2. Description of Related Art

Microfluidic systems of this type have been used increasingly in recent times because, given their small size, they require the use of only limited volumes of liquid, which has a number of advantages. This type of small equipment is relatively easy to mass produce at limited cost, incorporates a number of functions within a small overall size, and is highly reliable. In particular, for carrying out analyses by means of a reaction, these small devices offer high sensitivity and fast analysis and are easily transportable.

Microfluidic devices that achieve these objectives have been produced using techniques and materials that are conventionally used in the semiconductor industry. There is a need for microfluidic devices of this kind for more widespread use, with liquid circulation paths that are not totally predefined in advance, so that the liquid circulation paths can be finalized by the user from a number of options. Such modularity means that the same microfluidic device addresses multiple demands.

The document WO2004/050242 proposes a microfluidic device using a stack of plates for creating one of a number of microfluidic networks on demand, by means of an external command. To provide fluid communication between two cavities or passages, the wall between them is pierced by targeted electromagnetic radiation. Centrifugal force is applied to the liquid to move it.

Techniques of that type have a number of drawbacks, however. External means are necessary for rotating the microfluidic device to generate the centrifugal force, which greatly complicates implementation. Also, a centrifugal force can move the liquid in only one direction.

Activatable materials exist of volume that can be locally varied, in particular increased, upon activation, in particular thermal activation.

See for example B. Sämel, P. Griss, G. Stemme, "Expandable microspheres incorporated in a PDMS matrix: a novel thermal composite actuator for liquid handling in microfluidic applications", Transducers '03, 1558-1561 (2003), which demonstrates the possibility of filling small voids or larger reservoirs in a microfluidic device by using in the stack a layer formed of a composite material resulting from mixing a polymer, in particular polydimethylsiloxane (PDMS), or silicone, with expandable microspheres, in particular Expancel™ microspheres. In the present patent application this mixture of polydimethylsiloxane and Expancel™ microspheres is referred to as XBPDMS.

An object of the present invention is to propose a microfluidic device offering multiple options for forming three-dimensional liquid networks consisting of passages and/or valves and/or cavities. The microfluidic device can therefore be a device that is standard in terms of its fabrication, the end user being able to choose between the above-mentioned options, according to requirements, by activating one or more areas of an activatable material present in the device in one or more steps.

The expression "three-dimensional liquid network" refers to a liquid path at different heights within the stack forming the device, which increases the number of liquid paths used simultaneously without increasing the size of the device, which paths can cross without communicating with one another because they cross at different heights, and in particular in different layers of the stack.

SUMMARY OF THE INVENTION

To this end, the present invention proposes a microfluidic device including a first plate forming the substrate and including one or more perforations and, on each side of this first plate, at more than one location, a material that is adapted to define passage portions and is formed, at one or more of these locations, of an activatable material the volume of which can be varied by activating it, said material being arranged at said locations in such a way that, in a first phase, by activating one or more locations consisting of said activatable material, a first configuration is transformed into a second configuration, which modifies a three-dimensional network that, in the second configuration and depending on the locations chosen to be activated in said first phase, consists of different liquid paths having several passage portions in offset planes parallel to the plane of the first plate, at least on each side of this first plate, and between which said one or more perforations is situated, whereby the liquid passes through one of said perforations between the passage portions in offset planes.

Clearly, by choosing the locations at which the activatable material is activated during the first phase, a three-dimensional liquid network can be modified by creating or shutting off one or more passage portions on one or both sides of the first plate, near the perforations in the first plate. Because the activated areas change in volume (increase or decrease in volume), this modification is simple to effect by activating selected areas corresponding to or surrounding the passage portions to be created or shut off. Thus the three-dimensional network required for the application concerned can be produced on demand, starting with a single type of starting device.

The expression "three-dimensional network" refers to a liquid path at different heights within the stack forming the device, enabling a quantity of liquid to move from a first location to a second location. In particular, forming a single path from a number of options is combined with forming a number of liquid paths that coexist in a three-dimensional liquid network. Forming a number of liquid paths increases the number of liquid paths used simultaneously without increasing the size of the device, and these paths can cross without communicating with each other because they cross in different layers of the stack.

This solution also has the additional advantage, over and above ease of implementation, of using a device that is standard in terms of its fabrication to perform different functions using one or more liquid paths. It is very easy to control the variation of the volume of the activatable material in a targeted way.

Either only a portion of the material on each side of the first plate is said activatable material or all of the material on each side of the first plate is said activatable material.

With the activatable material forms only a portion, it can form all locations on one of the two sides of the first plate or only some of them.

Said activatable material can also be disposed at one or more locations on each side of said first plate.

Said activatable material is either of the type that increases in volume when it is activated or of the type that decreases in volume when it is activated.

Depending on the activatable material category, a material is used that is activated thermally, chemically or by electromagnetic stimulation.

More than one type and/or category of activatable material can be used in the same device, of course.

The location(s) on each face of the plate(s) forming the substrate covered with activatable material can either be localized on the surface of the plate(s) or they can cover a large area, and in particular the whole surface of the plate(s). When covering the whole surface, said activatable material takes the form of one or more layers covering the first plate.

The present invention makes it possible, using a small device, to obtain a three-dimensional flow of liquid and in particular to form a greater number of passages and/or cavities, which passages and/or cavities can cross without communicating with one another. Moreover, starting from a given device structure, users can adapt the device after fabrication layouts that meet their requirements.

In a first embodiment, activating the material generates passages that do not exist in the starting stack. This can be achieved either by activating areas corresponding to the passages of an activatable material that reduces in volume when it is activated or by activating areas around those intended to form the passages of an activatable material that increases in volume when it is activated.

Under such circumstances, during the transformation from the first configuration to the second configuration in the first phase, the modification of the three-dimensional network creates between the activated locations said passages forming with said perforation said three-dimensional network. Opening these passages enables the liquid to reach a part of the device that was not accessible to the liquid before the transformation of the first phase.

The activatable material is advantageously so that in a second phase during which locations not previously activated are activated passages previously created during the first phase are filled, which shuts off at least a portion of the three-dimensional network. Shutting off these passages or passage portions enables outflow from these passages in the direction of another portion of the device that was not filled with liquid before the transformation of the second phase.

In a first variant of the first embodiment, the liquid moves in the three-dimensional network essentially parallel to the plane of the first plate, especially when the device is formed of a stack the liquid path portion of which uses only the first plate and the activatable material covering it.

Under such circumstances, during the transformation from the first configuration to the second configuration in the first phase, the modification of the three-dimensional network creates between the activated locations the passages on each side of the first plate forming with said perforation said three-dimensional network. Because the liquid can pass through the first plate, opening these passages enables the liquid to reach a portion of the device that was not accessible to the liquid before the transformation of the first phase from the other side of the first plate.

The disposition of the activatable material is advantageously such that in a second phase, during which locations that were not previously activated are activated, passages previously created during the first phase are filled, which shuts off at least a portion of the three-dimensional network on each side of the first plate. Shutting off these passages enables outflow from those passages in the direction of another portion of the device situated on the other side of the first plate that was not filled with liquid before the transformation of the second phase.

In a second variant of the first embodiment, the liquid moves in the three-dimensional network parallel to the plane of the first plate and also orthogonally to the plane of the first plate, i.e. through the various layers of the stack. This is possible when the device is formed of a stack the portion which that includes the three-dimensional network and/or liquid network includes, in addition to the first plate, one or more other plates forming a substrate.

In the second variant of the first embodiment, the device further includes one or more second substrate plates including perforations offset relative to the perforations of the first plate, the activatable material disposed between the first plate and the second plate including one or more passages aligned with one of the perforations of the first plate so that activating the activatable material in the first phase creates passages establishing liquid communication between a perforation of the first plate and a perforation of the second plate.

At least two substrate plates are provided, i.e. two, three or more plates, including perforations offset between two successive plates, which can constitute liquid reservoirs, and between which the liquid can be caused to circulate, in particular to circulate downwards by gravity.

For example, the device includes one or more third substrate plates including perforations offset relative to the perforations of the second plate, the activatable material being also disposed between the second plate and the third plate and including one or more passages aligned with one of the perforations of the second plate so that activating the activatable material situated between the second plate and the third plate in a third phase creates passages establishing liquid communication between a perforation of the second plate and a perforation of the third plate.

In this way, by mixing in a perforation, the passage of the liquid from one level of the stack to a lower level can produce reactions between the different liquids.

For example, this circulation of liquid can mix two or more different liquids.

In an alternative implementation of the first embodiment, the device further includes a non-stick layer facing the locations of activatable material between the first plate and the activatable material adapted to form passage portions.

This prevents areas of the activatable material that are transformed into passages sticking to the plate forming the substrate during activation of the activatable material and ensures easy separation of the plate and the material to form the passage.

In a second embodiment, activating the material shuts off pre-existing passages in the starting stack, either by activating the areas corresponding to the passages of an activatable material that increases in volume when it is activated or by activating areas around those intended to form the passages of an activatable material that reduces in volume when it is activated.

Under such circumstances, in the first configuration a three-dimensional network is created with a liquid path with a number of passage portions formed of passages in offset planes parallel to the plane of the first plate, at least on each side of this first plate, between which the liquid passes through one of said perforations and the modification of the three-dimensional network in the first phase shuts off one or more of said passages by activating the corresponding locations of the activatable material, whereby a second configuration is formed obliging the liquid to exit the passage shut off in this way and to move in the network.

During the first phase, it is advantageous to activate a number of locations of activatable material in succession, whereby a number of said passages are shut off in succession, which obliges the liquid to exit the passages that are successively shut off and to move gradually through the network.

In this way a quantity of liquid can be moved step-wise as and when passages are shut off that are situated along the three-dimensional network or a portion of the three-dimensional network forming the path of that quantity of liquid.

The present invention further relates to using a device of the invention, as described above, to produce a mixture of two or more different reagent liquids so that a reaction, in particular a chemical reaction, occurs when the liquids come into contact.

Under such circumstances, said device is adapted in particular to convey said mixture of liquids to a cavity that enables analysis by optical, electrochemical, electromagnetic or magnetic sensing and is equipped with or connected to a sensing system.

One example of this sensing system, for analysis by optical sensing, uses a light source (such as a laser, a light-emitting diode or a spectral lamp, etc.) and a sensor (such as a photomultiplier or a semiconductor photodiode). For example, absorption of light emitted by the mixture obtained during the reaction can be measured by measuring the ratio of the intensity of the light emitted by the source and that sensed by the sensor placed over the mixture. One of the reagent liquids can be fluorescent, so the intensity of the fluorescence after excitation by the light source can be measured.

Analysis by electrochemical sensing uses two electrodes (of platinum, gold, silver, etc.) dipping into the liquid mixture, for example. The principle is to apply a constant voltage or current to the mixture via these electrodes and to measure the resulting current or voltage via the electrodes.

Finally, for analysis by electromagnetic or magnetic sensing, one or more of the liquids can contain magnets in the form of small beads migrating in said mixture of liquids under the influence of an electromagnetic or magnetic field, for example.

BREIF DESCRIPTION OF THE DRAWINGS

Other advantages and features of the invention emerge on reading the following description given by way of example and with reference to the appended drawings, in which:

FIGS. 7 to 11 are views similar to that of FIG. 5 showing how the device functions;

DESCRIPTION OF THE PREFERRED EMBODIMENTS

Reference is made first to FIGS. 1 to 11, showing variants of a first embodiment of the invention in which activating the activatable material generates previously non-existent passages in the starting stack.

Reference is made first to FIGS. 1 to 4 representing a number of examples of a first variant of the first embodiment in which a three-dimensional network is produced in which the liquid travels essentially parallel to the plane of the stack.

Figure 1:
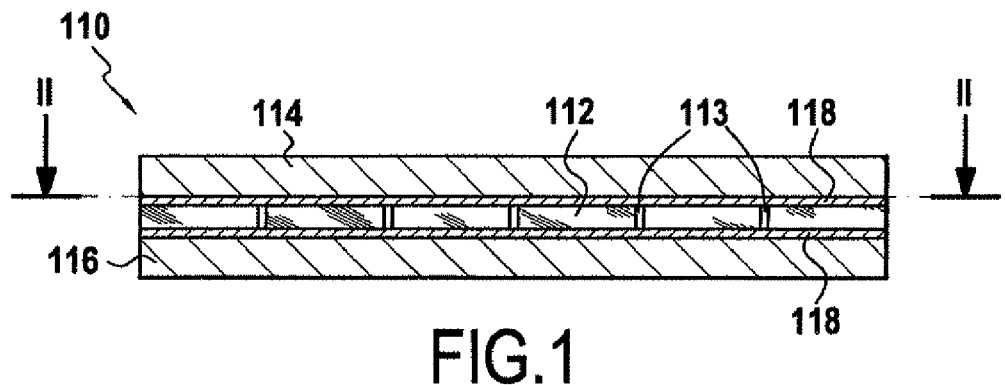
FIG. 1 is a view in section taken along the line I-I in FIG. 2 of a first variant of a first embodiment of a device of the invention in a first configuration.
Figure 2:
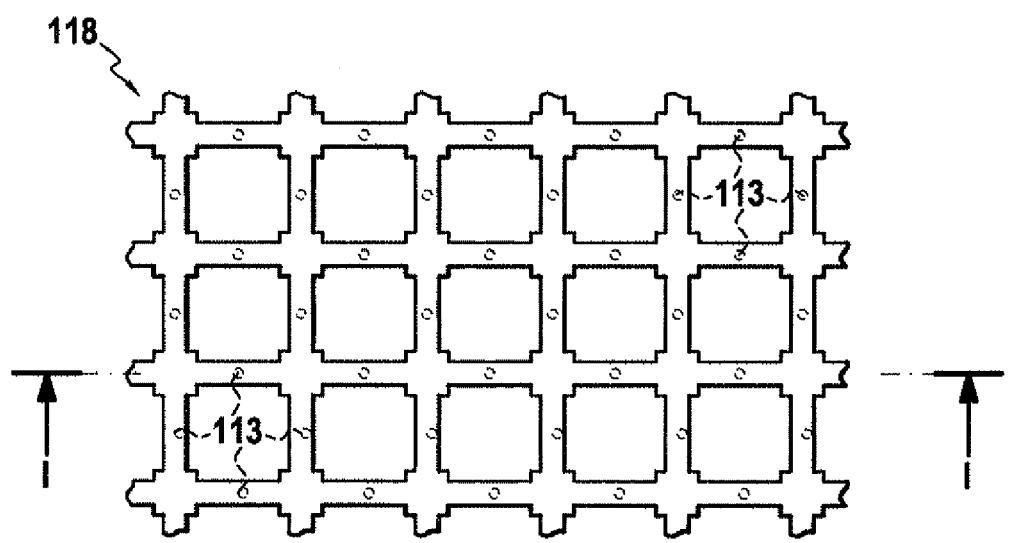
FIG. 2 is a partial plan view of the FIG. 1 device seen in the direction II-II.
Figure 3:
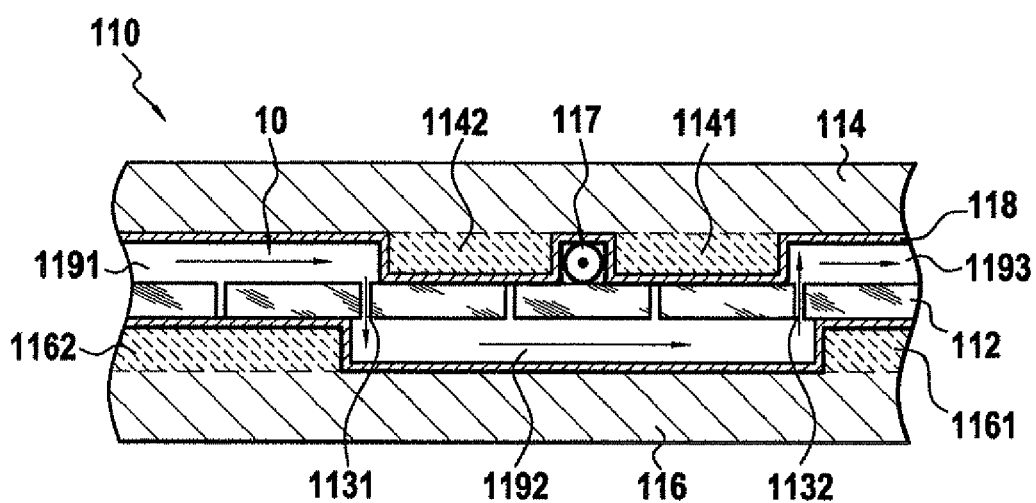
FIG. 3 is a view similar to that of FIG. 1, showing a second configuration.

FIGS. 1 to 3 represent a device 110 forming a stack consisting of a first plate 112 and two layers 114 and 116 of activatable material each covering one of the two faces of the first plate 112.

The first plate 112 forming the substrate can be produced in various rigid materials, in particular inert materials such as glass, including glass sold under the brand name Pyrex, polydimethylsiloxane (PDMS) or silicone.

Each first plate 112 has perforations 113 through it that are regularly distributed over the whole surface.

The layers 114 and 116 of activatable material are produced in XBPDMS, for example, namely by mixing polydimethylsiloxane and Expancel (registered trade mark) microspheres. These layers 114 and 116 can be deposited in liquid or viscous form and then distributed regularly in a thin layer by centrifugation on one and then the other face of the first plate 112; prior to drying.

Before creating the layers 114 and 116 of activatable material, a non-stick material is deposited first on each face of the first plate 112 in a pattern 118 that can be seen in FIG. 2 forming a network aligned with the perforations 113 of the first plate 112.

This non-stick material can be a metal, for example, such as gold, deposited on the first plate 112 by standard photolithographic techniques using masks.

At this stage it should be noted that, generally speaking, this non-stick material can be on the first plate 112 and/or on the layers 114 and 116 of activatable material. If this non-stick material is on the layers 114 and 116 of activatable material, it is clear that it covers the perforations 113.

The pattern 118 is formed of a network of orthogonal lines that cross in a large area, the perforations 113 of the first plate 112 being situated along these orthogonal lines, outside these crossing areas.

In the example shown in FIGS. 1 to 3, the pattern 118 of non-stick material covers the perforations 113 of the first plate 112.

The function of the non-stick material deposited in the pattern 118 is to guarantee that, when an area of the activatable material is activated, the adjacent area that is not activated and faces a portion of the pattern 118 does not stick to the first plate 112 and remains separate.

Refer to FIG. 3, in which different passages 117 and 119 are obtained by activating different areas of the layers 114 and 116 of activatable material, this FIG. 3 showing a second configuration of the device 110 whose first configuration is represented in FIG. 1.

To be more precise, in FIG. 3 there is seen the cross-section of a portion of a first passage 117 orthogonal to the plane of the figure that is obtained by activating two areas 1141 and 1142 of the surrounding layer 114 of activatable material.

In FIG. 3, there is also seen the longitudinal section of three portions 1191, 1192, and 1193 of a second passage 119 that pass on either side of the first plate 112: the two portions 1191 and 1193 in the upper layer 114 of activatable material are formed by activating areas 1141, 1142 and other areas that cannot be seen around these passage portions 1191 and 1193 of the upper layer 114 of activatable material.

The portion 1192 of the passage 119 is obtained by activating the areas 1161 and 1162 of the lower layer 116 of activatable material and other areas around this portion 1192 that cannot be seen.

Here this portion 1192 extends longitudinally along one of the lines of the pattern 118 of the anti-welding network, between perforations 1131 and 1132 of the first plate 112 providing liquid communication between the portion 1192 and the portions 1191 and 1193 of the passage 119.

It is therefore clear that activating the areas of the layers 114 and 116 around the passage portions creates these passages, which can follow the lines of the pattern 118 of the anti-welding network, on each side of the first plate 112.

It is equally clear, as can be seen in FIG. 3, that it is possible to form passages 117 and 119 which cross without mixing the liquids that they contain and are separated on either side of the first plate 112 where those passages 117 and 119 cross.

It is clear that in this variant there is initially no space between the first plate 112 and the layers 114 and 116 of activatable material, the passages 117 and 119 that define a circulation space for the liquid being formed by activating areas of the layers 114 and 116 of activatable material around the location of the passages that are being constructed.

Figure 4:
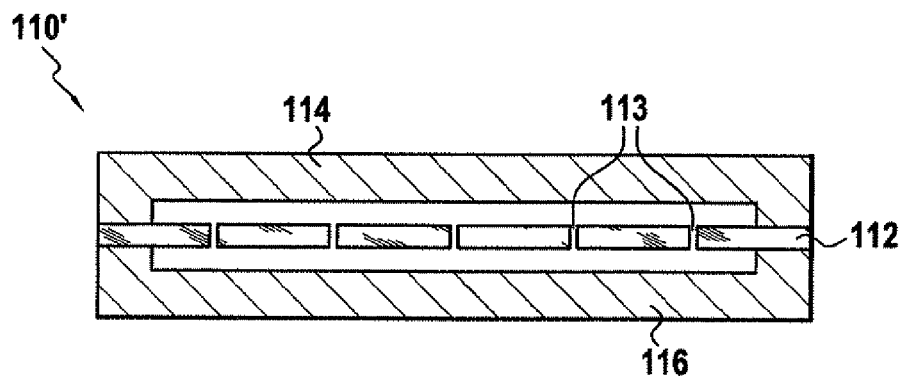
FIG. 4 is a view similar to that of FIG. 1 for a different embodiment.

Refer to FIG. 4. This shows another variant of the first embodiment in its first configuration, before activation of the activatable material: the first plate 112 again includes the perforations 113, but here the upper and lower layers 114 and 116, respectively, of activatable material have been disposed in the resulting stack so that they are not in contact with the first plate 112, except for in the peripheral area of the device 110'.

This is achieved by molding the layers 114 and 116 of activatable material before fixing them to the plate 112, for example.

To form the three-dimensional network 10, areas of each layer 114 and 116 of activatable material that will surround the passages to be created are activated. In these activated areas, because of the increase in the volume of the material constituting the areas 114, 116, these areas will come into contact with the first plate 112 to form a three-dimensional network 10 that can be identical to that of FIG. 3 where activation of the areas 1141, 1142, 1161, and 1162 is concerned.

Note that in this variant of the first embodiment shown in FIG. 4, there is no non-stick material.

FIGS. 5 to 11 are referred to below, showing one example of a second variant of the first embodiment of the invention in the form of a device 120.

What is required here is to circulate one or more liquids in a three-dimensional network in which a liquid path is formed in the stack, in particular a downward path by gravity. The particular aim is to form a network of passages and/or cavities enabling aspiration and mixing of different liquids and use of the mixtures.

In the embodiment shown there is a stack comprising three perforated plates, for example of glass, each forming a substrate, this stack being formed of a first plate 121, a second plate 122, and a third plate 123.

Each of these plates 121, 122, and 123 has respective relatively large perforations 1251, 1252, and 1253 through it forming small cavities. Between pairs of these plates 121, 122, and 123 there is a layer of activatable material covered with a pattern 128 of non-stick material that can be seen in FIG. 6.

To be more precise, between the first plate 121 and the second plate 122 there is a layer 126 of activatable material that includes passages 126a in vertical alignment with the perforations 1252 of the second plate 122.

As the perforations 1251 of the first plate 121 are offset relative to the perforations 1252 of the second plate 122, it is clear that initially there is no fluid communication between the perforations 1251 and 1252 of the first and second plates 121 and 122. Above the layer 126 of activatable material is the pattern 128 of anti-welding material shown in FIG. 6.

This figure shows the offset in the plane of the device 120 between the locations of the perforations 1252 of the second plate 122, which are concentric with the passages 126a, and the perforations 1251 of the first plate 121 (represented in dashed line).

This pattern 128 of non-stick material also forms a set of lines that cross in front of the perforations 1251, 1252, and 1253 of the plates 121, 122, and 123.

Here the pattern 128 of non-stick material is deposited on the first plate 121. It does not cover the passages 126a of the layer 126 of activatable material. In contrast, another option (not shown) is for the pattern 128 of non-stick material to be deposited on the layer 126 of activatable material so that it covers the passages 126a. A further option (not shown) is for this pattern 128 of non-stick material to be deposited both on the layer 126 of activatable material and on the first plate 121.

Also, between the second plate 122 and the third plate 123 there is a layer 127 of activatable material that includes passages 127a vertically aligned with the perforations 1253 of the third plate 123. Above the layer 127 of activatable material is a pattern of non-stick material similar to the pattern 128 described above.

Figure 5:
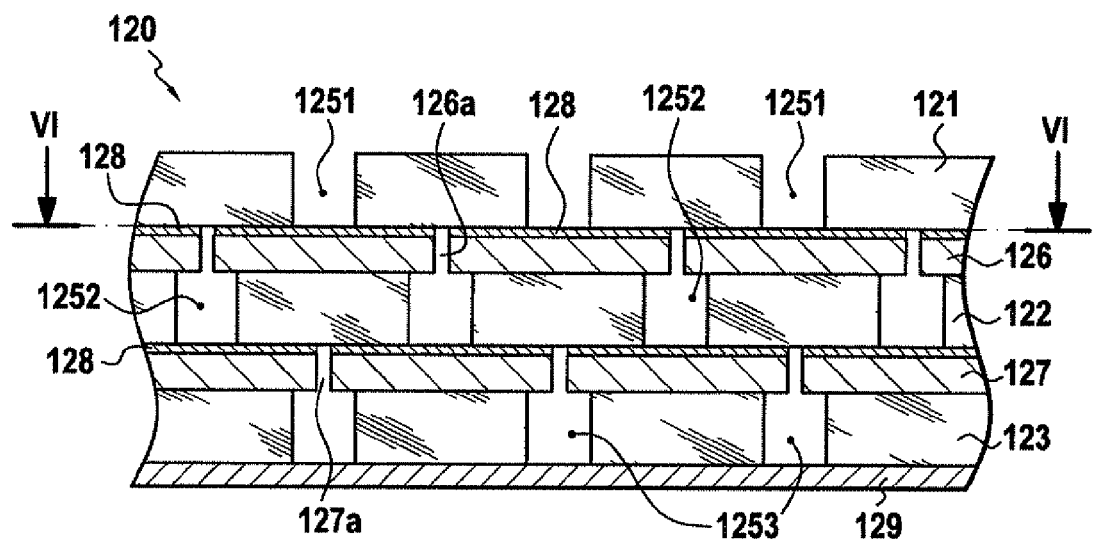
FIG. 5 is a view in section taken along the line V-V in FIG. 6 of a second variant of the first embodiment of a device of the invention in its first configuration.
Figure 6:
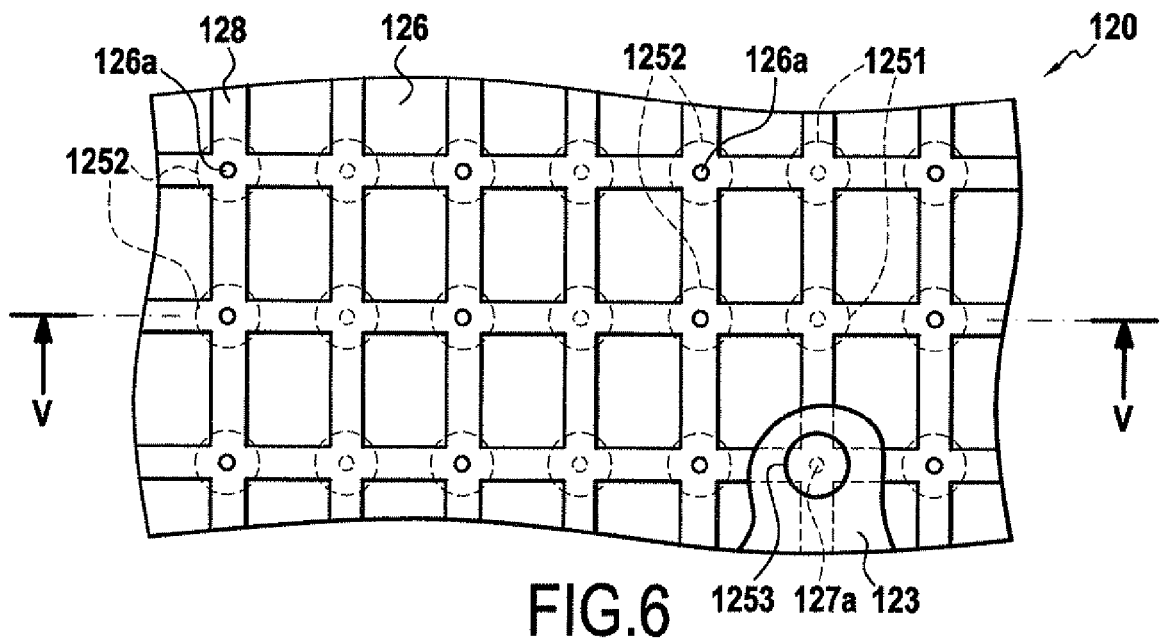
FIG. 6 is a partial top view of the FIG. 5 device as seen in the direction VI-VI.

In this example, as shown in FIG. 5, the perforations 1251 and 1253 of the first plate 121 and the third plate 123, respectively, are vertically aligned, although this is merely a special case.

Finally, to complete the stack 120, a closure plate 129 that forms a bottom shutting off the bottom portion of the perforations 1253 is connected and sealed to the third plate 123. This closing plate 129 is produced in glass, including glass sold under the brand name Pyrex, and is connected to the third plate 123 by a welding technique such as plasma bonding.

Refer to FIGS. 7 to 11, which show steps of the use of this kind of device 120 to produce mixtures.

FIG. 7 shows the device 120 from FIG. 5, which contains three different liquids 1241, 1242, and 1243 disposed in respective aligned perforations 1251 on the first plate 121 that consist of the perforations 12511, 12512, and 12513. In this situation, the three liquids 1241, 1242, and 1243 are separated from each other with no possibility of mixing.

After this step of filling the perforations 12511, 12512, and 12513 of the first plate 121, forming upper cavities, the structure of the layer 126 of activatable material between the first plate 121 and the second plate 122 is modified to enable some or all of these liquids 1241, 1242, and 1243 to move downward.

To this end, and as can be seen in FIG. 8, passages are formed, in particular the passages 1264, 1265, and 1266 that can be seen in FIG. 8, by activating certain areas including the areas 1261, 1262, and 1263 of the layer 126 of activatable material. To be more precise, the passage 1264 links the perforation 12511 containing the first liquid 1241 to the passage 126a1 of the layer 126 of activatable material that is itself in fluid communication with the perforation 12512 via the passage 1265.

At this stage, some of the liquid 1241 has entered the passage 1264 and some of the liquid 1242 has entered the passage 1265. What is more, creating the passage 1266 links the perforation 12513 to the passage 126a2 of the layer 126 of activatable material.

At this stage, it should be noted that producing the mixture of the liquids 1241 and 1242 can, if they are reagent liquids, produce a reaction, notably a chemical reaction, when the liquids 1241 and 1242 come into contact.

During the next phase, the result of which can be seen in FIG. 9, the areas 1264', 1265', and 1266' of the layer 126 of activatable material that before this corresponded to the locations of the passages 1264, 1265, and 1266 are activated.

Shutting off the passages 1264, 1265, and 1266 in this way moves the liquids that they contained downstream, as follows: the liquid 1241 that was present in the passage 1264 in the previous configuration represented in FIG. 8 and the third liquid 1243 that was present in the passage 1265 move into the perforation 12521 of the second plate 122 via the passage 126a1, which has remained intact, of the layer 126 of activatable material and the liquid 1243 that was present in the passage 1266 in FIG. 8 has entered the perforation 12522 of the second plate 122 via the passage 126a2, which has remained intact, in the layer 126 of activatable material.

Mixing the three starting liquids 1241, 1242, and 1243 is then finalized by carrying out the following two phases shown in FIGS. 10 and 11.

As can be seen in FIG. 10, the areas 1271 and 1272 of the layer 127 of activatable material between the second plate 122 and the third plate 123 are then activated, which creates passages 1273 and 1274 that are respectively filled with the mixture of the liquids 1241 and 1242 and with the liquid 1243, which respectively link perforations 12521 and 12522 of the second plate 122 to the passage 127a1 of the activatable material layer 127 situated lower down.

Finally, to produce the mixture, as can be seen in FIG. 11, the areas 1273' and 1274', of the layer 127', which previously formed the passages 1273 and 1274, are activated to oblige the liquid that was present in these two passages to pass via the passage 127a1 into the perforation 12531 of the third plate 123 inside which the mixture of the liquids 1241, 1242, and 1243 is formed.

Clearly the mixture of the three liquids 1241, 1242, and 1243 that are present in the perforation 12531 of the third plate 123 can thereafter be used for a new reaction in another portion, not shown, of the microfluidic device 120 and can for example feature a three-dimensional network conforming to the first variant of the first embodiment described above with reference to FIGS. 1 to 4.

Figure 12:
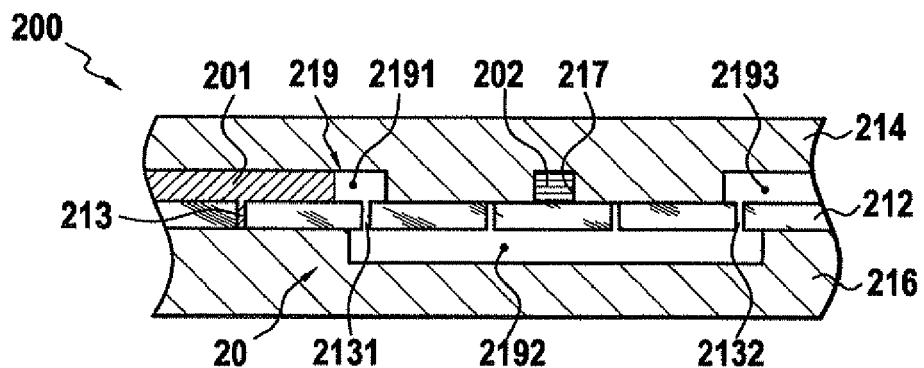
FIG. 12 is a view in section of a device conforming to the second embodiment of the invention in a first configuration.
Figure 13:
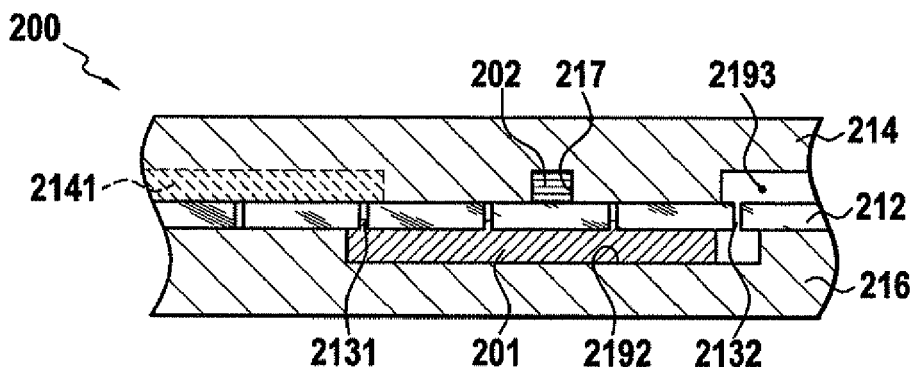
FIGS. 13 and 14 show how the FIG. 12 device functions.
Figure 14:
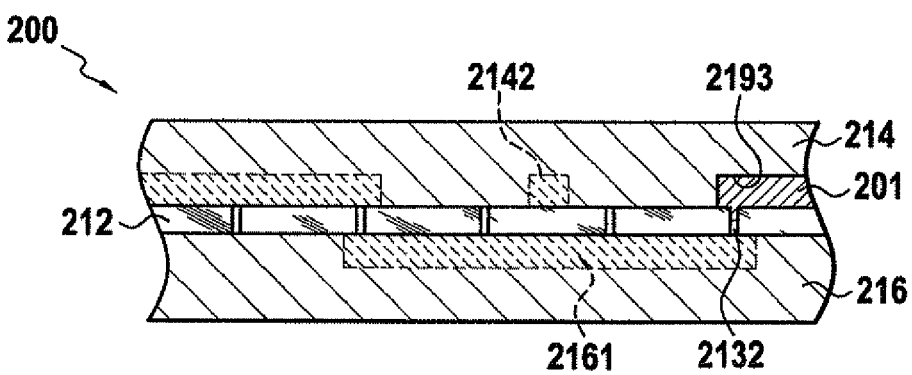

Refer to FIGS. 12 to 14, showing an example of use of the second embodiment of the invention, where activating the activatable material shuts off pre-existing passages in the starting stack, which causes the liquid to move forward.

A device 200 shown in FIGS. 12 to 14 initially forms a stack already having liquid passages 217 and 219. To be more precise, the stack forming the device 200 includes a first plate 112, for example of glass, with perforations 213 regularly distributed on its surface.

On each of its two faces, this plate 212 is covered with a layer of activatable material that is conformed to feature hollows intended to form the passages 217 and 219 before it is fixed to the first plate 1.

Thus, as can be seen in FIG. 12, the upper layer 214 of activatable material includes recesses including the portions 2191 and 2193 of the passage 219 and the passage 217 on its side facing toward the first plate 212. To this end, this layer 214 is molded in an imprint having projecting shapes complementary to those forming these recessed areas, for example, including the portions 2191 and 2193 of the passage 219 and the passage 217.

In the same way, as seen in FIG. 12, the lower layer 216 of activatable material has hollows including the portion 2192 of the passage 219 on its side that faces in the direction of the first plate 212.

It is therefore clear that the hollows intended to receive liquid, for example in the form of passages or cavities, have been created in the layers of activatable material before they are assembled into the stack, so there is no point using a non-stick material.

In this second embodiment, care must therefore be taken during the formation of the device 200, and in particular during the step of assembling the first plate 212 and the two layers 214 and 216 of activatable material, which can for example be effected using the plasma bonding technique (plasma activation welding), correctly placing the recessed locations of the two layers 214 and 216 of activatable material facing the perforations 213 of the first plate 212, to establish liquid communication between the passage portions 2191, 2192, and 2193 on either side of the first plate 212, which portions must belong to the same passage of the three-dimensional fluidic network 20.

Thus in the present example the portion 2191 of the passage 219 communicates with the portion 2192 via the perforation 2131 and the portion 2192 communicates with the portion 2193 via the perforation 2132. In contrast, the portion of the passage 217 visible in FIG. 12 is above the portion 2192 and so no perforation 213 joins them and the passages 217 and 219 are totally separated by the first plate 212 where they cross, as seen from above.

FIGS. 12 to 14 show an example of use of the device 200: as seen in FIG. 12, a liquid 201 is disposed in the portion 2191 of the passage 219 and another, different liquid 202 is disposed in the passage 217.

In a first phase seen in FIG. 13, the area 2141 of the upper layer 214 of activatable material corresponding to the portion 2191 is activated so that the liquid 201 that was previously located there is moved in the downstream direction as far as the portion 2192, via the perforation 2131, thereby passing to the other side of the first plate 212.

In a second phase, seen in FIG. 14, the area 2142 of the upper layer 214 of activatable material corresponding to the location of the passage 217 seen in FIGS. 12 and 13 is activated so that the liquid 202 is moved into another portion of the passage 217 that cannot be seen in FIG. 14. In this second phase the area 2161 of the lower layer 216 of activatable material previously corresponding to the location of the portion 2192 is also activated so that the liquid 201 that was located there in the previous phase is moved in the downstream direction into the portion 2193 of the passage 219 on the other side of the first plate 212 in the layer 216 of activatable material, passing through the perforation 2131.

It is therefore clear that here the movement of the liquid 201 or 202 is effected from a pre-existing passage portion by shutting off that passage portion, by activating the corresponding area of the layer of activatable material that carries that passage portion, whereby the liquid is expelled into the passage portion further downstream.

However, it is clear that this kind of device 200 that includes pre-existing passage portions can also be used to create other new passage portions by activating areas around this kind of portion in the same layer of activatable material, as in the first embodiment.

Note that the device of the second embodiment of the invention shown in FIGS. 12 to 14 that has just been described can also consist initially in a device analogous to that of the first embodiment and conforming to FIG. 1, where it is necessary to activate beforehand the areas of the layers 114 and 116 of activatable material around the locations corresponding to the passages 217 and 219 in order to create said passages.

The invention clamed is:

1. A microfluidic device comprising a first plate forming a substrate and including one or more perforations and, on each side of the first plate, at more than one location, a material that is adapted to define passage portions and is formed, at one or more of these locations, of an activatable material, the volume of which can be varied by activating it, said material being arranged at said locations in such a way that, in a first phase, by activating one or more locations consisting of said activatable material, a first configuration is transformed into a second configuration, which modifies a three-dimensional network that, in the second configuration and depending on the locations chosen to be activated in said first phase, includes different liquid paths having several passage portions situated in offset planes parallel to the plane of the first plate, at least on each side of this first plate, and between which said one or more perforations is situated.

2. The device according to claim 1, wherein said activatable material is disposed at one or more locations on each side of said first plate.

3. The device according to claim 1, wherein, during the transformation from the first configuration to the second configuration in the first phase, the modification of the three-dimensional network creates between the activated locations said passages forming with said perforation said three-dimensional network.

4. The device according to claim 3, wherein the activatable material is disposed so that, in a second phase during which locations not previously activated are activated, passages previously created during the first phase are filled, which shuts off at least a portion of the three-dimensional network.

5. The device according to claim 1, wherein, during the transformation from the first configuration to the second configuration in the first phase, the modification of the three-dimensional network creates between the activated locations the passages on each side of the first plate forming with said perforation said three-dimensional network.

6. The device according to claim 5, wherein the disposition of the activatable material is such that, in a second phase during which locations not previously activated are activated, passages previously created during the first phase are filled, which shuts off at last a portion of the three-dimensional network on each side of the first plate.

7. The device according to claim 3, further including a second substrate plate including perforations offset relative to the perforations of the first plate, the activatable material disposed between the first plate and the second plate including one or more passages aligned with one of the perforations of the first plate so that activating the locations of the activatable material in the first phase creates passages establishing liquid communication between a perforation of the first plate and a perforation of the second plate.

8. The device according to claim 7, wherein activating other locations of the activatable material disposed between the first plate and the second plate in a second phase shuts off the passages created in the first phase to block liquid communication between said perforation of the second plate and said perforation of the first plate.

9. The device according to claim 7, further including a third substrate plate including perforations offset relative to the perforations of the second plate, the activatable material being also disposed between the second plate and the third plate and including one or more passages aligned with one of the perforations of the second plate so that activating the locations of the activatable material situated between the second plate and the third plate in a third phase creates passages establishing liquid communication between a perforation of the second plate and a perforation of the third plate.

10. The device according to claim 1, further including, facing the locations of activatable material adapted to form passages, a non-stick layer between the first plate and the activatable material.

11. The device according to claim 1, wherein in the first configuration there exists a three-dimensional network creating a liquid path with path portions formed of passages situated in offset planes parallel to the plane of the first plate, at least on each side of this first plate, between which the liquid passes through one of said perforations and the modification of the three-dimensional network in the first phase shuts off of one or more of said passages by activating the corresponding locations of the activatable material, whereby a second configuration is formed obliging the liquid to exit the passage shut off in this way and to move in the network.

12. The device according to claim 11, wherein a number of locations of activatable material are activated in succession in the first phase, whereby a number of said passages are shut off in succession, which obliges the liquid to exit successively the passages that are shut off and to move gradually in the network.

13. The device according to claim 1, wherein said activatable material is formed of one or more layers covering the first plate.

14. The device according to claim 1, wherein said activatable material can be activated thermally, chemically or by a electromagnetic stimulation.

15. The device according to claim 1, wherein said activatable material is of the type that increases in volume when it is activated.

* * * * *